US011915190B2

(12) United States Patent
Nagarathinam et al.

(10) Patent No.: US 11,915,190 B2
(45) Date of Patent: Feb. 27, 2024

(54) AUTOMATED CURBSIDE FULFILLMENT

(71) Applicant: Walmart Apollo, LLC, Bentonville, AR (US)

(72) Inventors: Arun Prasad Nagarathinam, Santa Clara, CA (US); Sahana Vijaykumar, Sunnyvale, CA (US); Madhavan Kandhadai Vasantham, Dublin, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 50 days.

(21) Appl. No.: 17/740,615

(22) Filed: May 10, 2022

(65) Prior Publication Data

US 2022/0270039 A1    Aug. 25, 2022

Related U.S. Application Data

(63) Continuation of application No. 16/598,298, filed on Oct. 10, 2019, now abandoned.

(60) Provisional application No. 62/780,149, filed on Dec. 14, 2018.

(51) Int. Cl.
| | |
|---|---|
| *G06Q 10/0836* | (2023.01) |
| *G06K 7/14* | (2006.01) |
| *G06Q 10/0833* | (2023.01) |
| *G06Q 10/087* | (2023.01) |
| *G06V 20/62* | (2022.01) |

(Continued)

(52) U.S. Cl.
CPC ....... *G06Q 10/0836* (2013.01); *G06K 7/1413* (2013.01); *G06Q 10/0833* (2013.01); *G06Q 10/087* (2013.01); *G06V 20/625* (2022.01); *G06V 2201/08* (2022.01); *H04L 67/10* (2013.01); *H04L 67/12* (2013.01)

(58) Field of Classification Search
CPC ........... G06Q 10/0836; G06Q 10/0833; G06Q 10/087; G06K 7/1413; G06V 20/625; G06V 2201/08; H04L 67/10; H04L 67/12
See application file for complete search history.

(56) References Cited

U.S. PATENT DOCUMENTS

| | | | |
|---|---|---|---|
| 9,928,531 | B2 | 3/2018 | McCarthy |
| 10,380,537 | B2 | 8/2019 | Agasti et al. |
| 10,453,025 | B2 | 10/2019 | Agasti et al. |

(Continued)

*Primary Examiner* — Paul Danneman
(74) *Attorney, Agent, or Firm* — Morgan, Lewis & Bockius LLP; Manita Rawat

(57) ABSTRACT

A system includes a processor coupled with a data store and configured to transmit an availability message to a user device and receive a pickup message from the user device. The processor is also configured to calculate an arrival time based on the initiation time, the initiation location, and a distribution center location for the distribution center and update the arrival time at continuous intervals based on real-time information. The processor is also configured to transmit a preparation message to a distribution center device, receive an arrival message from a distribution center image sensor, and transmit a delivery message to the distribution center device. The processor is also configured to transmit an order receipt message to the distribution center image sensor and receive a departure message from the distribution center image sensor including an image identifying the vehicle associated with the item order based on the corresponding vehicle identifier.

18 Claims, 4 Drawing Sheets

(51) Int. Cl.
*H04L 67/10* (2022.01)
*H04L 67/12* (2022.01)

(56) References Cited

U.S. PATENT DOCUMENTS

| | | | |
|---|---|---|---|
| 2013/0204719 A1* | 8/2013 | Burry | G06Q 50/12 |
| | | | 705/15 |
| 2014/0074743 A1 | 3/2014 | Rademaker | |
| 2014/0379529 A1 | 12/2014 | Agasti | |
| 2016/0247113 A1* | 8/2016 | Rademaker | G06Q 10/083 |
| 2019/0259232 A1 | 8/2019 | Nandakumar | |

* cited by examiner

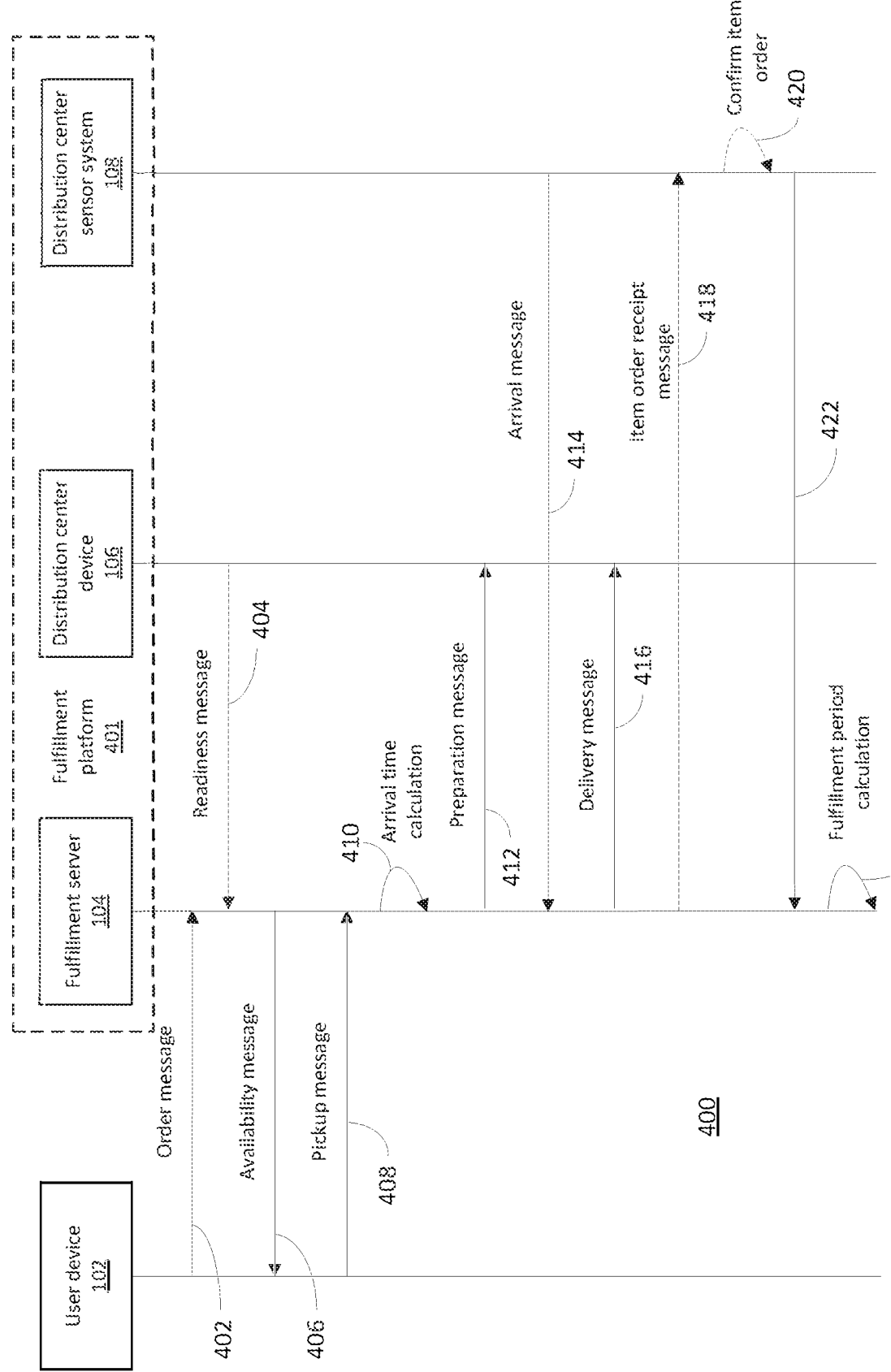

AUTOMATED CURBSIDE FULFILLMENT

CROSS-REFERENCE

This application is a continuation of U.S. patent application Ser. No. 16/598,298 filed Oct. 10, 2019, which claims priority to U.S. Provisional Application No. 62/780,149, filed Dec. 14, 2018. The entire disclosures of the applications referenced above are incorporated by reference.

TECHNICAL FIELD

This application relates generally to automated curbside fulfillment for item order delivery to vehicles at a distribution center.

BACKGROUND

One or more items may be ordered as an item order for pickup at a distribution center (e.g., a brick and mortar storefront or item order pickup location). This item order may be, for example, one or more items (e.g., discrete, deliverable products such as groceries, food, toiletries, clothing, and/or other personal property) ordered by a user (e.g., customer) from a merchant (e.g., operator of the distribution center). This item order may be, for example, an item order over the phone or off of an electronic commerce (e.g., e-commerce) website maintained by the merchant. Based on the item order, the constituent items in the item order may be ordered by the merchant to be available at (e.g., brought to) the identified distribution center for pickup by the user. Traditionally, the merchant may provide a time for the user to arrive at the distribution center for pickup. The user would then travel to the distribution center and check in at a kiosk (e.g., a physical check in area at the distribution center) for item order pickup. The merchant or other personnel at the distribution center would then search, locate, and retrieve the item order from storage for fulfillment (e.g., delivery) to the user at the kiosk. Accordingly, traditional techniques for item order fulfillment may require the user to check in at the distribution center's kiosk for item order fulfillment. Also, the pickup time would be dictated by the merchant, rather than by the user. Therefore, traditional techniques of item order fulfillment may not be entirely satisfactory.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In an embodiment, a system includes at least one processor operatively coupled with a datastore, the at least one processor configured to send an availability message to a user device, where the availability message indicates that an item order is ready for pickup. The at least one processor is also configured to receive a pickup message from the user device, where the pickup message comprises an initiation time, an initiation location, a license plate number, and a distribution center identifier for a distribution center. The at least one processor is also configured to calculate an arrival time based on the initiation time, the initiation location, and a distribution center location for the distribution center. The at least one processor is also configured to send a preparation message to a distribution center device, where the preparation message comprises the arrival time. The at least one processor is also configured to receive an arrival message from a distribution center image sensor, where the arrival message indicates that a vehicle with the license plate number has arrived at a vehicle pickup area associated with the distribution center. The at least one processor is also configured to send a delivery message to the distribution center device, wherein the delivery message indicates that the item order is to be provided to the vehicle.

In further embodiments, the preparation message configures a material handling system to deliver the item order from a warehouse to a front office waiting area. In further embodiments, the delivery message configures the material handling system to deliver the item order to a curbside pickup area. In further embodiments, the material handling system is handled manually via a human operator. In further embodiments, the at least one processor is further configured to determine a departure time when the vehicle with the license plate exits the vehicle pickup area. In further embodiments, the at least one processor is further configured to determine a difference between the departure time and the arrival time as a fulfillment period. In further embodiments, the at least one processor is further configured to send the fulfillment period to the user device. In further embodiments, the at least one processor is further configured to: receive an order message from the user device, where the order message identifies the item order prior to sending the availability message. In further embodiments, the availability message includes an item order pickup identifier configured to be read by a scanner.

In an embodiment, a method of automated curbside fulfillment comprises sending, from at least one processor operatively coupled with a datastore, an availability message to a user device, wherein the availability message indicates that an item order is ready for pickup; receiving a pickup message from the user device, wherein the pickup message comprises an initiation time, an initiation location, a license plate number, and a distribution center identifier for a distribution center; calculating an arrival time based on the initiation time, the initiation location, and a distribution center location for the distribution center; and sending a preparation message to a distribution center device, wherein the preparation message comprises the arrival time.

In an embodiment, the method further comprises receiving an arrival message from a distribution center image sensor, wherein the arrival message indicates that a vehicle with the license plate number has arrived at a vehicle pickup area associated with the distribution center; and sending a delivery message to the distribution center device, wherein the delivery message indicates that the item order is to be provided to the vehicle. In an embodiment, the method further comprises determining a departure time when the vehicle with the license plate exits the vehicle pickup area.

In an embodiment, the method further comprises determining a difference between the departure time and the arrival time as a fulfillment period. In an embodiment, the method further comprises sending the fulfillment period to the user device. In an embodiment, the method further comprises receiving an order message from the user device, where the order message identifies the item order prior to sending the availability message.

In an embodiment a system comprises a user device, a distribution center device and a distribution center image sensor positioned at a distribution center, and at least one processor operatively coupled with a datastore. The at least one processor is configured to send an availability message to the user device, wherein the availability message indicates that an item order is ready for pickup, receive a pickup message from the user device, wherein the pickup message comprises an initiation time, an initiation location, a license plate number, and a distribution center identifier for a distribution center, calculate an arrival time based on the initiation time, the initiation location, and a distribution center location for the distribution center, send a preparation message to the distribution center device, wherein the preparation message comprises the arrival time, receive an arrival message from the distribution center image sensor, wherein the arrival message indicates that a vehicle with the license plate number has arrived at a vehicle pickup area associated with the distribution center, and send a delivery message to the distribution center device, wherein the delivery message indicates that the item order is to be provided to the vehicle.

In an embodiment the preparation message configures a material handling system to deliver the item order from a warehouse to a front office waiting area. In an embodiment the delivery message configures the material handling system to deliver the item order to a curbside pickup area. In an embodiment the material handling system is handled manually via a human operator. In an embodiment the availability message includes an item order pickup identifier configured to be read by a scanner.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

FIG. 4 is a diagram that illustrates an automated curbside fulfillment process, in accordance with some embodiments.

DETAILED DESCRIPTION OF EXEMPLARY EMBODIMENTS

Figure 1:
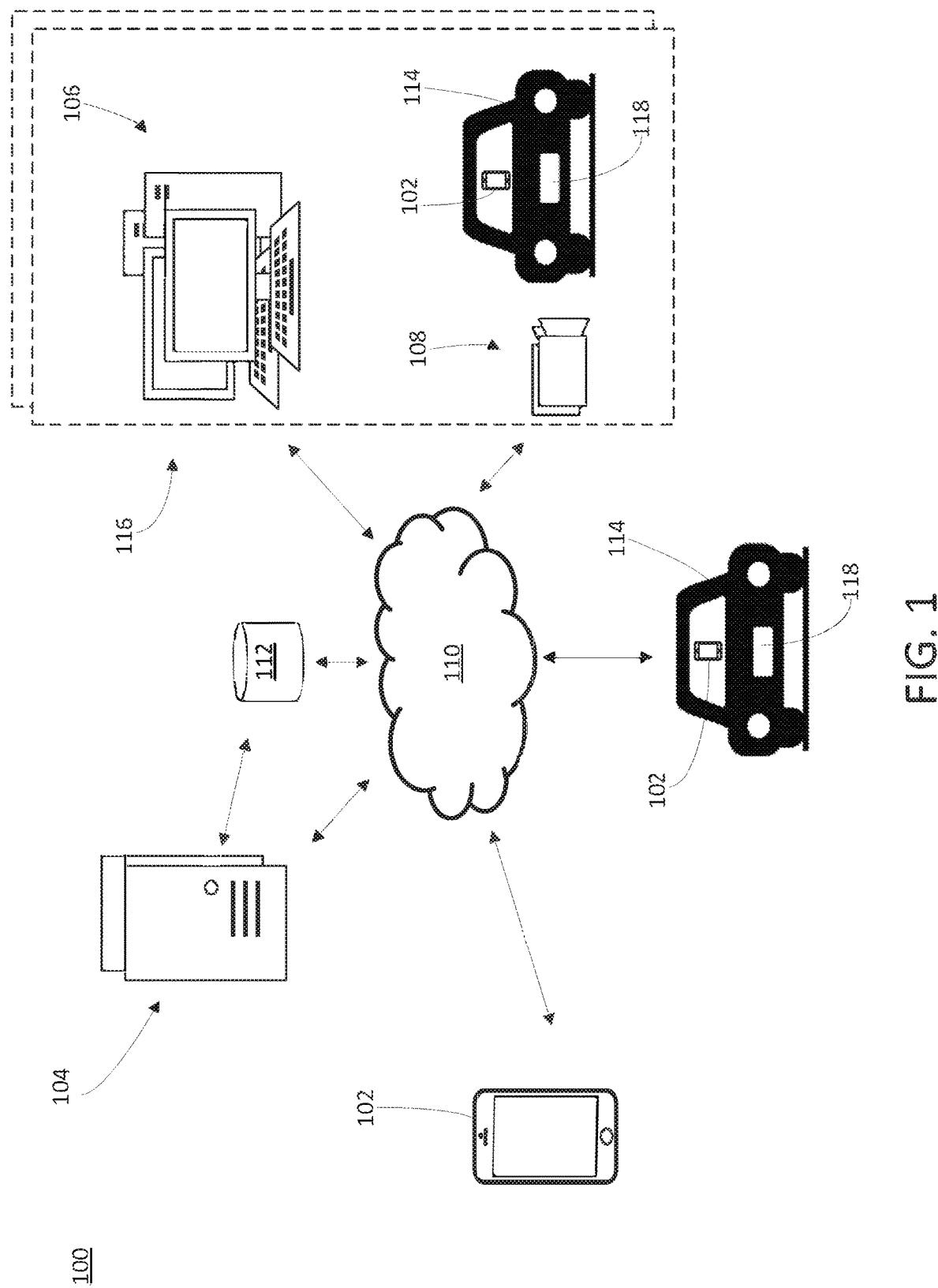
FIG. 1 is a system diagram illustrating features of automated curbside fulfillment, in accordance with certain embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

A new approach is proposed that contemplates systems and methods for automated curbside fulfillment. As noted above, traditionally a user would check in for item order fulfillment at a kiosk within a distribution center to receive an item order after a time dictated by a merchant. However, automated curbside fulfillment allows a user to receive an item order without exiting the user's vehicle and at a time dictated by the user, not by the merchant. This enhances the user's experience by reducing the amount of time that a user must take for item order fulfillment after availability at the distribution center and by catering to the user's schedule.

In various embodiments, a fulfillment platform may interact with a user device to implement automated curbside fulfillment. The fulfillment platform may include at least one fulfillment server, a distribution center device, and a distribution center sensor system. The fulfillment server may be configured to communicate with the user device to identify an item order, notify the user device as to when the item order is available for pickup and receive details from the user device on how the item order is to be picked up. These details may be provided with a pickup message from the user device that details, for example, an initiation time, an initiation location, a license plate number, and, optionally, a distribution center identifier. In certain embodiments, the license plate number and/or distribution center identifier may be automatically associated with a user account or other stored information associated with the user and not provided in the pickup message. The initiation time may indicate a time in which the user is intending to depart to the distribution center for item order pickup. The initiation location may indicate a location in which the user is intending to depart to the distribution center for item order pickup. The license plate number may be a unique and official identifier for the vehicle that the user will be taking to the distribution center for item order pickup. Also, the distribution center identifier may indicate the distribution center, or the pickup location for item order pickup. In certain embodiments, the distribution center identifier may be optional as there may be only be a single distribution center possible for item order pickup.

Based on the details provided by the user device, the fulfillment server may determine a projected arrival time for the user. This projected arrival time may be calculated once in response to receiving the initiation time and initiation location or may be calculated at certain intervals or continuously using live information (e.g., global positioning system (GPS) based location information) concerning the location of the user device as it is traveling to the distribution center. This arrival time may be calculated in accordance with conventional automotive navigation techniques in which the initiation location and/or live location information from the user device is used for position data. This position data is then correlated to geospatial data (e.g., streets in a map database) to determine a route to the distribution center (e.g., the destination). This route may be determined via, for example, a solution to the shortest path problem in graph theory. A projected time to the distribution center may be calculated in a conventional manner based on projected vehicle speeds, and/or other information such as traffic patterns available via a traffic information server to obtain travel time for different street segments of the route.

In response to the projected arrival time, the fulfillment server may communicate with a distribution center device at the distribution center to get the item order ready for pickup. The distribution center device may be any device locally at the distribution center configured to communicate with equipment and/or personnel at the distribution center. This communication may include a preparation message that instructs the distribution center to move the item order from a warehouse to a storefront of the distribution center. The warehouse may be a back office storage location where items are stored or organized for long term storage. The warehouse may be where items are stored upon delivery to the distribution center. The storefront may be a front office where items may be temporarily stored for quick retrieval. The storefront may be where a kiosk is located and/or where items may be browsed and/or user interactions may occur. The manner of item storage at the warehouse may be different than at the storefront, such as where item storage at the warehouse may be indexed based on the type of item while item storage at the storefront may be based on item order, where multiple item orders may be assembled from items at the warehouse and brought to the storefront for storage. In various embodiments, movement of the item order at the distribution center may be performed in a manual manner (e.g., as moved by distribution center personnel). In particular embodiments, movement of the item order at the distribution center may be made via automated equipment (e.g., via a system of robotic arms, automated guided vehicles, and/or conveyor belts).

The distribution center sensor system may monitor for vehicles that arrive at the distribution center for pickup of item orders. The distribution center sensor system may include an arrival image sensor (e.g., camera) configured for automated license plate number recognition. Automated license plate number recognition may be performed by the distribution center sensor system in a conventional manner using optical character recognition on images to read license plate numbers (e.g., numbers or identifiers on vehicle registration plates) within the arrival image sensor's field of view. The recognized license plate number may be communicated from the distribution center sensor system to the fulfillment server. The recognized license plate may be cross referenced by the fulfillment server with the license plate number provided by the user device to identify the specific item order for pickup.

Upon cross referencing the recognized license plate number with the item order, the fulfillment server may send a delivery message to the distribution center device to order delivery of the item order from the storefront to a curbside pickup area for loading onto the vehicle with the recognized license plate. This delivery may be made manually via distribution center personnel and/or via the automated equipment at the distribution center. The user and/or the distribution center personnel may then load the item order onto the vehicle with the recognized license plate. Once the item order is loaded, the vehicle may exit the distribution center.

In certain embodiments, the distribution center sensor system may monitor for vehicles that depart from the distribution center after pickup of item orders. The distribution center sensor system may include an departure image sensor (e.g., camera) configured for automated license plate number recognition. The recognized license plate number may be communicated from the distribution center sensor system to the fulfillment server. The recognized license plate may be cross referenced by the fulfillment server with the license plate number provided by the user device to identify the specific item that has been picked up and fulfilled. In certain embodiments, the fulfillment server may determine a fulfillment period between the time that the arrival image sensor detected the recognized vehicle associated with the item order and when the departure image sensor detected the recognized vehicle associated with the item order. This fulfillment period may be associated with either the user and/or the distribution center as a statistic for evaluating a level of service either rendered to the user and/or provided by the distribution center. In certain embodiments, this fulfillment period may be provided to the user device for future item orders so that the user may determine the level of service provided by the distribution center for future item order pickup.

FIG. 1 is a system diagram 100 illustrating features of automated curbside fulfillment, in accordance with certain embodiments. A user device 102, fulfillment server 104, distribution center device 106, and distribution center sensor system 108, may be interconnected over a network 110, such as the Internet. Also, each of the user device 102, fulfillment server 104, distribution center device 106, and distribution center sensor system 108 may constitute one or more individual computing devices. For example, the fulfillment server 104 may represent one or more servers configured to provide the functionality of the fulfillment server, the user device 102 may constitute one more user devices associated with a user or a user account, the distribution center device 106 may consist one or more devices that may communicate with personnel or automated equipment at the distribution center, and the distribution center sensor system may consist of one or more sensors configured to produce sensor data that may be analyzed to identify a particular license plate number and/or item order. In certain embodiments, fulfillment server 104 may be directly coupled locally with a datastore 112. This datastore may include information, such as user accounts and historical fulfillment periods associated with one or more distribution centers.

In various embodiments, the user device 102 may be configured to be transported within a vehicle 114 (e.g., an automobile) and be utilize as a location sensor for the vehicle as the user is traveling from an initiation location to the distribution center 116. However, in other embodiments, the vehicle 114 itself may represent the user device 102, such as where the vehicle includes (e.g., may function as) a network connected computing device configured to communicate over the network 110.

In a number of embodiments, the distribution center sensor system 108 and the distribution center device 106 may be collocated at the distribution center 116. For example, the distribution center sensor system 108 may be located at specific locations at a curbside pickup area of the distribution center 116. For example, the distribution center sensor system 108 may be located at an intake bottleneck location where vehicles arriving for order pickup via automated curbside fulfillment must pass through. Thus, the image sensors of the distribution center sensor system 108 may capture image data characterizing the license plate 118 of each vehicle that passes into the curbside pickup area. The license plate 118 may be located at a set predetermined position on each vehicle, such as within an license plate area at a back and/or a front of a vehicle. Then, the license plate number for each license plate may be recognized and cross referenced with item orders to determine whether there is an item order for pickup by the recognized license plate number. Furthermore, the distribution center sensor system 108 may also be located at a departure bottleneck location where vehicles departing from the distribution center 116 after item order fulfillment must pass. Thus, the image sensors of the distribution center sensor system 108 may capture image data characterizing the license plate of each vehicle that leaves from the curbside pickup area. This image data may be analyzed to identify vehicles associated with an item order so as to determine when the item order has been fulfilled.

Also, the distribution center device 106 may also be located at the distribution center, such as at a storefront area, warehouse area, or the curbside pickup area of the distribution center 116. Accordingly, the distribution center device may relay instructions or notifications for distribution center personnel and/or equipment to move the item order from the warehouse area to the storefront area, and/or from the storefront area to the curbside pickup area for delivery of the item order to the vehicle identified as being associated for the item order for delivery. In certain embodiments, the distribution center device 106 may serve as a user interface for distribution center personnel to interact with the fulfillment server 104.

In specific embodiments, the distribution center sensor system 108 may also include a scanner (e.g., a bar code scanner or reader) configured to read an item order pickup identifier that may be provided to the user device. The item order pickup identifier may include a barcode (e.g., an optical machine readable representation of data) that may be read by the scanner and confirmed as being associated with the item order. Accordingly, the vehicle associated with the item order may be further verified prior to item order delivery or fulfillment by determining the presence of the user device with the proper item order pickup identifier associated with the item order.

In particular embodiments, there may be multiple distribution centers 116 with multiple distribution center devices 106 and distribution center sensor systems 108. Accordingly, the fulfillment server 104 and datastore 112 may be configured to centrally provide services for automated curbside fulfillment among the multiple distribution centers 116.

Figure 2:
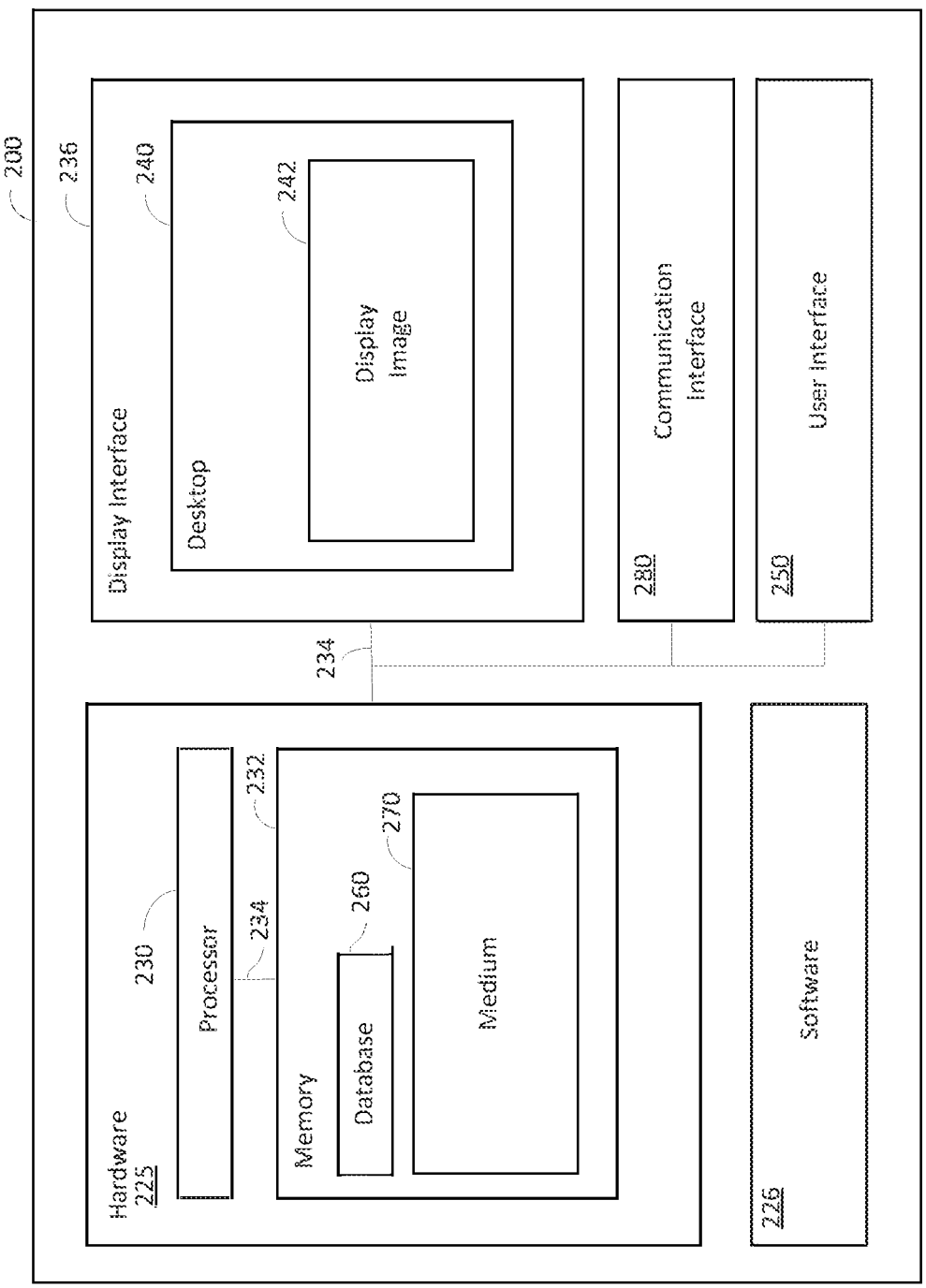
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular device (e.g., for a user device, a distribution center device, distribution center sensor system) or server (e.g., for a fulfillment server). In some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a number of GB of RAM. Memory 232 can also be a ROM, a network interface (NIC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from an operator of the computing device 200. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface.

In some embodiments, the computing device 200 can include a database 260 within memory 232, such that various information can be stored within database 260.

Alternatively, in some embodiments, database 260 can be included within a remote datastore (not shown) or a remote server (not shown) with file sharing capabilities, such that database 260 can be accessed by computing device 200 and/or remote end operators. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a server machine, smartphone, a laptop PC, a desktop PC, a tablet, a Google's Android device, an iPhone, an iPad, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, the Internet, an intranet, a wide area network (WAN), a local area network (LAN), a wireless network, Bluetooth, WiFi, and a mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

A network may be utilized as a vehicle of communication. In various aspects, the network may comprise local area networks (LAN) as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3:
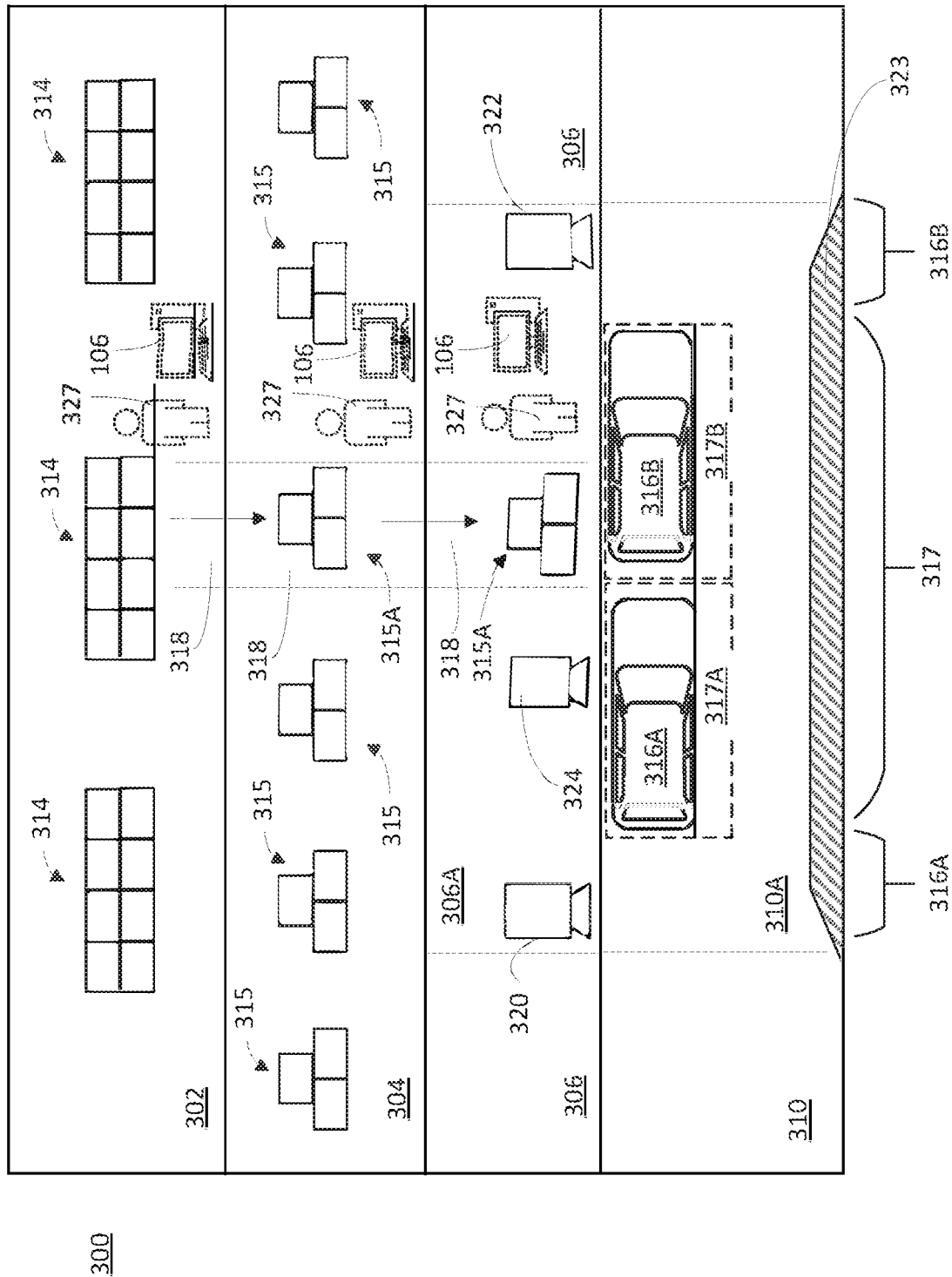
FIG. 3 is an illustration of a distribution center, in accordance with some embodiments.

FIG. 3 is an illustration of a distribution center 300, in accordance with some embodiments. The distribution center 300 may include several areas, such as a warehouse area 302, a storefront area 304, a curbside area 306, curbside pickup area 306A, a vehicle traversal area 310 (e.g., a road or a parking lot), and a vehicle pickup traversal area 310A.

Items may be inventoried and stored at the warehouse area 302 when they are initially stored at the distribution center 300. For example, items may be brought to the distribution center 300 from another location and then stored at the warehouse area 302. Furthermore, the items may be inventoried at the warehouse area to determine what items are available at the distribution center 300 for fulfillment. For example, an inventory of each of the items in the warehouse area 302 may be entered into the distribution center device 106 and stored in, for example, a datastore. The datastore may be a remote datastore accessible to the distribution center device 106 over a network or accessible locally to the distribution center device 106. Also, each of the items in the warehouse area 302 may be arranged in a particular order in accordance with the type of item for easier retrieval and/or access at a later time. For example, similar or same items may be arranged together in discrete item clusters, 314 such as on shelves or other storage mechanism. The distribution center device 106 may be drawn in outline to illustrate that the distribution center device 106 may be either fixed in a particular area of the distribution center or may be moved as desired within the distribution center or may represent many different but interconnected distribution center devices arranged at various locations throughout the distribution center, such as also at the storefront area 304, curbside area 306 or curbside pickup area 306A.

The storefront area 304 may be a front office where item orders 315, assembled from the items in the warehouse area 302, may be stored for retrieval. Also, the storefront area 304 may be where a kiosk is located and/or where items may be browsed and/or in person customer interactions may occur. Accordingly, the manner of item storage at the warehouse area 302 may be different than at the storefront area 304, such as where item storage at the warehouse area 302 may be organized based on the type of item (e.g., as item clusters 314) while item storage at the storefront area 304 may be based on item order 315, 315A (e.g., stored as item orders or as indexed or based on item order). Thus, multiple item orders 315, 315A may be assembled from items at the warehouse area 302 and brought to the storefront area 304 for storage.

The curbside pickup area 306A may be a designated area curbside (e.g., adjacent to a vehicle pickup traversal area 310A) for delivery to a vehicle with a license plate number associated with an item order. In certain embodiments, the curbside pickup area 306A may be a designated, specific area for curbside pickup, such as next to certain parking locations or within a particular location at the vehicle pickup traversal area 310A. Accordingly, the curbside pickup area 306A may be associated with an associated vehicle pickup traversal area 310A. The vehicle pickup traversal area 310A may define a part of a vehicle traversal area 310 in which curbside delivery of an item order 315, 315A may take place. In particular embodiments, the vehicle pickup traversal area 310A may include a vehicle arrival area 316A, a vehicle pickup area 317, and a vehicle departure area 316B. In particular embodiments, a barrier 323 may be used to further define structure for the vehicle pickup traversal area 310A. Also, optionally in particular embodiments, individual vehicle pickup spots 317A, 317B may designate specific spots for vehicles to park or idle as they receive their item orders for pickup.

A distribution center sensor system may include multiple sensors, such as an arrival image sensor 320, a departure image sensor 322, and a scanner 324. Each of the arrival image sensor 320, departure image sensor 322, and scanner 324 may be configured to monitor for activities within, or near, the vehicle pickup traversal area 310A.

For example, the arrival image sensor 320 and departure image sensor 322 may be image sensors configured to collect image data that may be analyzed to identify a license plate number. In certain embodiments, the arrival image sensor 320 and departure image sensor 322 may also record the time (e.g., a timestamp) in which image data of a particular license plate number was captured. Also, these license plate numbers may be cross referenced with item orders associated with the license plate numbers. Thus, image data and associated timestamps may be utilized to determine an arrival time and a departure time for vehicles with particular license plate numbers and associated with particular item orders.

More specifically, the arrival image sensor 320 may determine when a vehicle with a particular license plate number arrives at the vehicle pickup traversal area 310A. This license plate number may be cross referenced with item orders 315, 315A to determine a particular item order 315A associated with the particular license plate number. Accordingly, vehicle arrivals may be documented by associating the particular license plate number with a timestamp of when the image data that characterizes the particular license plate number was captured by the arrival image sensor 320, along with the item order associated with the particular license plate number. Then, the particular item order 315A may be brought out curbside next to the vehicle with the particular license plate number for delivery and/or loading onto the vehicle.

Furthermore the departure image sensor 322 may determine when the vehicle with the particular license plate number associated with the item order 315A leaves the curbside pickup area 306A. Accordingly, vehicle departures may be documented by associating the particular license plate number with a timestamp of when the image data that characterizes the particular license plate number was captured by the departure image sensor 322, along with the item order associated with the particular license plate number.

In specific embodiments, a scanner 324 (e.g., a bar code scanner or reader) may be configured to read an item order pickup identifier provided to the user device. The item order pickup identifier may include a barcode or other an optical machine readable representation of data that may be read by the scanner 324 to confirm association with the item order prior to item order delivery. Accordingly, the vehicle associated with the item order may be further verified prior to item order delivery or fulfillment by determining the presence of the item order pickup identifier associated with the item order.

In certain embodiments, the inventory of items at the warehouse area 302 may indicate that an item order is available. Stated another way, an item order may be available when all items within the item order are available at the warehouse area 302. The inventory of items at the warehouse area 302 may be entered into a datastore accessible to a fulfillment server. Accordingly, the fulfillment server may check the datastore and send an availability message to the appropriate user device associated with the item order when all items within the item order are available at the warehouse area 302. This availability message may indicate that the item order is available and ready for pickup.

The fulfillment server may receive a pickup message from the user device in response to the availability message. The pickup message may be parsed, for example, to determine an initiation location, an initiation time, and license plate number. The fulfillment server may then determine a projected arrival time based on the pickup message and send a preparation message to the distribution center device 106 for assembly and storage of the item order in the storefront area 304. Then, in response to the arrival of a vehicle associated with the license plate number in the pickup message, the fulfillment server may send a delivery message to the distribution center device 106 for delivery of the item order curbside to the arrived vehicle.

In various embodiments, movement of the item order at the distribution center 300 may be performed in a manual manner (e.g., as moved by distribution center personnel 327). The distribution center personnel 327 may be illustrated in dotted lines to indicate that the distribution center personnel may be a single person or multiple people that may move around the distribution center 300 to move items and/or item orders around the distribution center 300. In particular embodiments, movement of the item order at the distribution center may be made via automated equipment 328 (e.g., via a system of robotic arms, automated guided vehicles, and/or conveyor belts). The automated equipment may be illustrated as an area within dotted lines to represent, for example, a conveyor belt system that may move items between the warehouse area 302, storefront area 304 and/or curbside pickup area 306A. In certain embodiments, the distribution center personnel 327 may work in conjunction with the automated equipment 328 to move items around the distribution center 300.

For example, the distribution center device 106 may receive a preparation message from the fulfillment server. The preparation message may indicate a projected time of arrival with an item order. Accordingly, the distribution center personnel 327 and/or the automated equipment 328 may assemble items from the warehouse area 302 into item orders stored in the storefront area 304. Also, the distribution center device 106 may receive a delivery message from the fulfillment server. Accordingly, the distribution center personnel 327 and/or the automated equipment 328 may deliver item order from the storefront area 304 to the vehicle pickup traversal area 310A. In particular embodiments, distribution center personnel 327 may further confirm the item order using the scanner 324 to confirm that a particular vehicle is associated with a particular item order. In other embodiments, distribution center personnel 327 may confirm the item order based on license plate number to confirm that a particular vehicle is associated with a particular item order.

In various embodiments, the item order may be for perishable or nonperishable items. For example, the item order may include perishable items such as food or groceries for which time idling at the curbside pickup area 306A and/or at the storefront area 304 should ideally be kept to a minimum. For example, perishable grocery items may be frozen or refrigerated in the warehouse area 302 but then brought to an unfrozen or unrefrigerated curbside pickup area 306A. Time spent either by a user at the distribution center 300 and/or by item orders at the curbside pickup area 306A may be advantageously reduced in accordance with various embodiments of automated curbside fulfillment.

FIG. 4 is a diagram that illustrates an automated curbside fulfillment process 400, in accordance with some embodiments. The process 400 may be performed by the user device 102, the fulfillment server 104, the distribution center device 106, and the distribution center sensor system 108, interconnected over a network such as the Internet. In certain embodiments, the combination of the fulfillment server 104, the distribution center device 106, and the distribution center sensor system 108 may be referred to as a fulfillment platform 401. It is noted that the process 400 is merely an example, and is not intended to limit the present disclosure. Accordingly, it is understood that additional operations may be provided before, during, and after the process 400 of FIG. 4, certain operations may be omitted, certain operations may be performed concurrently with other operations, and that some other operations may only be briefly described herein.

At operation 402, the user device 102 may send an order message to the fulfillment server 104. The order message may identify, and include a request for, an item order. For example, the order message may be a message sent over an e-commerce system for an order (e.g., purchase) of particular items as an item order.

At operation 404, optionally, a readiness message may be sent to the fulfillment server 104 from the distribution center device 106. The readiness message may notify the fulfillment server 104 that an item order is ready and available at a particular distribution center. For example, various items may be shipped periodically to various distribution centers such that an item order, previously unavailable, may finally match an inventory of the particular distribution center based on the periodic item deliveries. In other embodiments, items in the item order may be managed (e.g., shipped to the particular distribution center) using the fulfillment server such that no readiness message is necessary.

At operation 406, an availability message may be sent from the fulfillment server 104 to the user device 102. The availability message may notify the user device that the item order is available at the particular distribution center (e.g., the distribution center associated with the distribution center device 106). This availability message may be sent as based on the receipt at the fulfillment server 104 of the readiness message noted in operation 404 or may be based on other information (e.g., receipt of a predetermined shipment of the item order) confirming that the items within the item order are available at the particular distribution center associated with the distribution center device 106.

At operation 408, the user device 102 may send a pickup message to the fulfillment server 104. The pickup message may indicate an initiation time, an initiation location, a license plate number, and, optionally, a distribution center identifier. The distribution center identifier may indicate the distribution center, or the pickup location for item order pickup. In certain embodiments, the distribution center identifier may be optional as there may be only be a single distribution center possible for item order pickup. The initiation time may indicate a time in which the user is intending to depart to the distribution center identified in the distribution center identifier (e.g., the distribution center with the item order) for item order pickup. The initiation location may indicate a location in which the user is intending to depart to the distribution center for item order pickup. The license plate number may indicate an identification code for the vehicle that the user will be taking to the distribution center for item order pickup.

At operation 410, the fulfillment server 104 may calculate a projected arrival time. In certain embodiments, the projected arrival time may be calculated once in response to receiving the initiation time and initiation location. In further embodiments, the projected arrival time may be calculated at certain intervals or continuously using live information concerning the location of the user device as it is traveling to the distribution center. This arrival time may be calculated in accordance with conventional automotive navigation techniques in which the initiation location and/or live location information from the user device is used for position data. This position data is then correlated to geospatial data (e.g., streets in a map database) to determine a route to the distribution center (e.g., the destination). This route may be determined via, for example, a solution to the shortest path problem in graph theory. A projected time to the distribution center may be calculated based on projected vehicle speeds, and possibility other information such as traffic patterns available via a traffic information server to obtain travel time for different street segments of the route. In various embodiments, the location of the distribution center (e.g., as identified by the distribution center identifier) may be known and/or retrievable from a datastore by the fulfillment server.

At operation 412, the fulfillment server 104 may send a preparation message to the distribution center device. The preparation message may instruct personnel and/or automated equipment at the distribution center to move the item order from a warehouse to a storefront of the distribution center. In various embodiments, movement of the item order at the distribution center may be performed in a manual manner (e.g., as moved by distribution center personnel). In particular embodiments, movement of the item order at the distribution center may be made via automated equipment (e.g., via a system of robotic arms, automated guided vehicles, and/or conveyor belts). In further embodiments, movement of the item order at the distribution center may be performed by both distribution center personnel and automated equipment.

At operation 414, the distribution center sensor system 108 may send an arrival message to the fulfillment server 104. As noted above, the distribution center sensor system may monitor for vehicles that arrive at the distribution center for pickup of item orders. The distribution center sensor system may include an arrival image sensor (e.g., camera) configured for automated license plate number recognition. Automated license plate number recognition may be performed by the distribution center sensor system (e.g., by the arrival image sensor) in a conventional manner using optical character recognition on images to read license plate numbers (e.g., numbers or identifiers on vehicle registration plates) within the arrival image sensor's field of view. The recognized license plate number may be communicated from the distribution center sensor system to the fulfillment server as part of the arrival message. In certain embodiments, the arrival image sensor may collect sensor data (e.g., image data) that may be communicated to the fulfillment server as part of the arrival message to perform automated license plate number recognition. The recognized license plate may be cross referenced by the fulfillment server with the license plate number provided by the user device to identify the specific item order for pickup.

Upon cross referencing the recognized license plate number with the item order, the fulfillment server may send a delivery message to the distribution center device to order delivery of the item order from the storefront to a location curbside for loading onto the vehicle with the recognized license plate. This delivery may be made manually via distribution center personnel and/or via the automated equipment at the distribution center. The user and/or the distribution center personnel may then load the item order onto the vehicle with the recognized license plate.

At operation 418, optionally as noted with dotted lines, the distribution center sensor system 108 may receive an item order pickup identifier message from the fulfillment server 104. The item order pickup identifier message may be sent at the same time, or may be sent after, the delivery message of operation 416. The item order pickup identifier message may include an item order pickup identifier. In certain embodiments, this item order pickup identifier may be provided to the user device 102 along with the availability message of operation 406.

At operation 420, optionally as noted with dotted lines, the distribution center sensor system 108 may confirm the item order. The distribution center sensor system may include a scanner (e.g., a bar code scanner or reader) configured to read the item order pickup identifier provided by operation 418. The item order pickup identifier may include a barcode (e.g., an optical machine readable representation of data) that may be read by the scanner and confirmed as being associated with the item order. The scanner may be operated by distribution center personnel and/or may be at a predetermined location near a vehicle pickup traversal area to scan item order pickup identifiers. Accordingly, the vehicle associated with the item order may be further verified prior to item order delivery or fulfillment by determining the presence, or previous receipt at the user device 102, of the proper item order pickup identifier associated with the item order.

At operation 422, the distribution center sensor system 108 may send a departure message to the fulfillment server 104. The distribution center sensor system may monitor for vehicles that depart from the distribution center after pickup of item orders. The distribution center sensor system may include an departure image sensor (e.g., camera) configured for automated license plate number recognition. The recognized license plate number may be communicated as part of the departure message from the distribution center sensor system to the fulfillment server. In certain embodiments, the departure image sensor may collect sensor data (e.g., image data) that may be communicated to the fulfillment server to perform automated license plate number recognition. The recognized license plate may be cross referenced by the fulfillment server with the license plate number provided by the user device to identify the specific item order that has been picked up and fulfilled.

At operation 424, the fulfillment server may determine a fulfillment period. The fulfillment period may be between the time that the arrival image sensor detected the vehicle associated with the item order and when the departure image sensor detected the vehicle associated with the item order. The fulfillment period may be associated with either the user and/or the distribution center as a statistic for evaluating a level of service rendered to either the user and/or provided by the distribution center. In certain embodiments, this fulfillment period may be provided to the user device for future item orders so that the user may be notified of the level of service provided by the distribution center.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system, comprising:
    at least one processor operatively coupled with a data store, the at least one processor configured to:
        receive an order message from a user device, the order message identifying an item order;
        transmit an availability message to the user device in response to the order message, the availability message indicating that the item order is ready for pickup;
        receive a pickup message from the user device for pickup of the item order identified by the order message, the pickup message including an initiation time, an initiation location, a vehicle identifier, and a distribution center identifier for a distribution center;
        calculate an arrival time based on the initiation time, the initiation location, and a distribution center location for the distribution center;
        update the arrival time at continuous intervals based on real-time information;
        transmit a preparation message to a distribution center device, the preparation message including the updated arrival time;
        receive an arrival message from a distribution center image sensor configured for vehicle identifier recognition, the arrival message indicating that a vehicle corresponding to the vehicle identifier included in the pickup message has arrived at a vehicle pickup area associated with the distribution center and has been recognized by the distribution center image sensor;

transmit a delivery message to the distribution center device, the delivery message indicating that the item order identified by the order message is to be provided to the vehicle;

transmit an order receipt message to the distribution center image sensor, the order receipt message including an item order pickup identifier; and receive a departure message from the distribution center image sensor including an image identifying the vehicle associated with the item order based on the corresponding vehicle identifier.

2. The system of claim 1 further comprising a material handling system configured to deliver the item order from a warehouse to a front office waiting area based on the preparation message.

3. The system of claim 2 wherein the material handling system is configured to deliver the item order to a curbside pickup area based on the delivery message.

4. The system of claim 3 wherein the material handling system is handled manually via a human operator.

5. The system of claim 1 wherein the at least one processor is further configured to determine a departure time when the vehicle corresponding to the vehicle identifier exits the vehicle pickup area.

6. The system of claim 5 wherein the at least one processor is further configured to determine a difference between the departure time and the updated arrival time as a fulfillment period.

7. The system of claim 6 wherein the at least one processor is further configured to send the fulfillment period to the user device.

8. The system of claim 1 further comprising a scanner configured to read the item order pickup identifier included in the availability message.

9. A method of automated curbside fulfillment comprising:

receiving an order message from a user device, the order message identifying an item order;

transmitting, from at least one processor operatively coupled with a data store, an availability message to the user device in response to the order message, the availability message indicating that the item order is ready for pickup;

receiving a pickup message from the user device for pickup of the item order identified by the order message, the pickup message including an initiation time, an initiation location, a vehicle identifier, and a distribution center identifier for a distribution center;

calculating an arrival time based on the initiation time, the initiation location, and a distribution center location for the distribution center;

updating the arrival time at continuous intervals based on real-time information;

transmitting a preparation message to a distribution center device, the preparation message including the updated arrival time;

receiving an arrival message from a distribution center image sensor configured for vehicle identifier recognition, the arrival message indicating that a vehicle corresponding to the vehicle identifier included in the pickup message has arrived at a vehicle pickup area associated with the distribution center and has been recognized by the distribution center image sensor;

transmitting a delivery message to the distribution center device, the delivery message indicating that the item order identified by the order message is to be provided to the vehicle;

transmitting an order receipt message to the distribution center image sensor, the order receipt message including an item order pickup identifier; and receiving a departure message from the distribution center image sensor including an image identifying the vehicle associated with the item order based on the corresponding vehicle identifier.

10. The method of claim 9 further comprising instructing, via a material handling system, delivery of the item order from a warehouse to a front office waiting area based on the preparation message.

11. The method of claim 10 further comprising determining a departure time when the vehicle corresponding to the vehicle identifier exits the vehicle pickup area.

12. The method of claim 11 further comprising determining a difference between the departure time and the updated arrival time as a fulfillment period.

13. The method of claim 12 further comprising sending the fulfillment period to the user device.

14. A system, comprising:

a user device;

a distribution center device positioned at a distribution center;

a distribution center image sensor positioned at the distribution center; and at least one processor operatively coupled with a data store, the at least one processor configured to:

receive an order message from the user device, the order message identifying an item order;

transmit an availability message to the user device in response to the order message, the availability message indicating that the item order is ready for pickup;

receive a pickup message from the user device for pickup of the item order identified by the order message, the pickup message including an initiation time, an initiation location, a vehicle identifier, and a distribution center identifier for the distribution center;

calculate an arrival time based on the initiation time, the initiation location, and a distribution center location for the distribution center;

update the arrival time at continuous intervals based on real-time information;

transmit a preparation message to a distribution center device, the preparation message including the updated arrival time;

receive an arrival message from a distribution center image sensor configured for vehicle identifier recognition, the arrival message indicating that a vehicle corresponding to the vehicle identifier included in the pickup message has arrived at a vehicle pickup area associated with the distribution center and has been recognized by the distribution center image sensor;

transmit a delivery message to the distribution center device, the delivery message indicating that the item order identified by the order message is to be provided to the vehicle;

transmitting an order receipt message to the distribution center image sensor, the order receipt message including an item order pickup identifier; and receiving a departure message from the distribution center image sensor including an image identifying the vehicle associated with the item order based on the corresponding vehicle identifier.

15. The system of claim 14 further comprising a material handling system configured to deliver the item order from a warehouse to a front office waiting area based on the preparation message.

16. The system of claim 15 wherein the material handling system is configured to deliver the item order to a curbside pickup area based on the delivery message.

17. The system of claim 16 wherein the material handling system is handled manually via a human operator.

18. The system of claim 17 further comprising a scanner configured to read the item order pickup identifier included in the availability message.

\* \* \* \* \*